United States Patent [19]
Nukada et al.

[11] Patent Number: 5,338,636
[45] Date of Patent: Aug. 16, 1994

[54] DICHLOROTIN PHTHALOCYANINE CRYSTAL ELECTROPHOTOGRAPHIC PHOTORECEPTOR USING THE SAME, AND COATING COMPOSITION FOR ELECTROPHOTOGRAPHIC PHOTORECEPTOR

[75] Inventors: Katsumi Nukada; Akira Imai; Katsumi Daimon; Masakazu Iijima; Kiyokazu Mashimo; Yasuo Sakaguchi; Ichiro Takegawa, all of Minami-ashigara, Japan

[73] Assignee: Fuji Xerox Co., Ltd., Tokyo, Japan

[21] Appl. No.: 1,515

[22] Filed: Jan. 6, 1993

Related U.S. Application Data

[63] Continuation-in-part of Ser. No. 948,482, Sep. 22, 1992, abandoned.

[30] Foreign Application Priority Data

Sep. 27, 1991 [JP] Japan .................. 3-274872
Jan. 13, 1992 [JP] Japan .................. 4-021683
Jan. 20, 1992 [JP] Japan .................. 4-27448

[51] Int. Cl.$^5$ .................. G03G 5/06; C09B 47/08
[52] U.S. Cl. .................. 430/59; 430/58; 430/78; 540/141; 252/501.1
[58] Field of Search .................. 430/58, 78, 59; 540/141, 136; 252/501.1

[56] References Cited

U.S. PATENT DOCUMENTS

| | | | |
|---|---|---|---|
| 3,824,099 | 7/1974 | Champ et al. | 430/58 |
| 4,108,863 | 8/1978 | Komai et al. | 540/141 |
| 4,814,256 | 3/1989 | Aldag et al. | 540/136 |
| 4,842,970 | 6/1989 | Tai et al. | 430/58 |
| 4,981,767 | 1/1991 | Tokura et al. | 430/58 |
| 5,126,223 | 6/1992 | Kikuchi et al. | 430/59 |

FOREIGN PATENT DOCUMENTS

| | | |
|---|---|---|
| 59-155847 | 9/1984 | Japan . |
| 62-247374 | 10/1987 | Japan . |
| 64-80965 | 3/1989 | Japan . |
| 1-144057 | 6/1989 | Japan . |
| 1-257967 | 10/1989 | Japan . |
| 2-175763 | 7/1990 | Japan . |
| 2-178358 | 7/1990 | Japan . |
| 3-61952 | 3/1991 | Japan . |
| 3-174542 | 7/1991 | Japan . |
| 3-174543 | 7/1991 | Japan . |
| 4-93366 | 3/1992 | Japan . |

OTHER PUBLICATIONS

Zeitschrift fü anorganische und allgemeine Chemie, Band 354, Heft 1–2, S. 1–112, Starke et al., pp. 1–9, Sep. 1967.

Primary Examiner—Christopher Rodee
Attorney, Agent, or Firm—Oliff & Berridge

[57] ABSTRACT

A novel dichlorotin phthalocyanine crystal having distinct diffraction peaks at 8.5°, 11.2°, 14.5°, and 27.2° of the Bragg angles ($2\theta \pm 0.2$) in the X-ray diffraction spectrum; process for producing the dichlorotin phthalocyanine crystal, comprising mechanically grinding a known dichlorotin phthalocyanine crystal together with an inorganic salt, followed by, if desired, a solvent treatment; an electrophotographic photoreceptor containing, in the photosensitive layer thereof, the dichlorotin phthalocyanine crystal; and a coating composition for producing an electrophotographic photoreceptor, comprising the dichlorotin phthalocyanine crystal, a binder resin, and an acetic ester solvent. The photoreceptor exhibits high sensitivity and excellent durability. The coating composition maintains the dichlorotin phthalocyanine crystal in its desired form either while being prepared or after being coated.

14 Claims, 6 Drawing Sheets

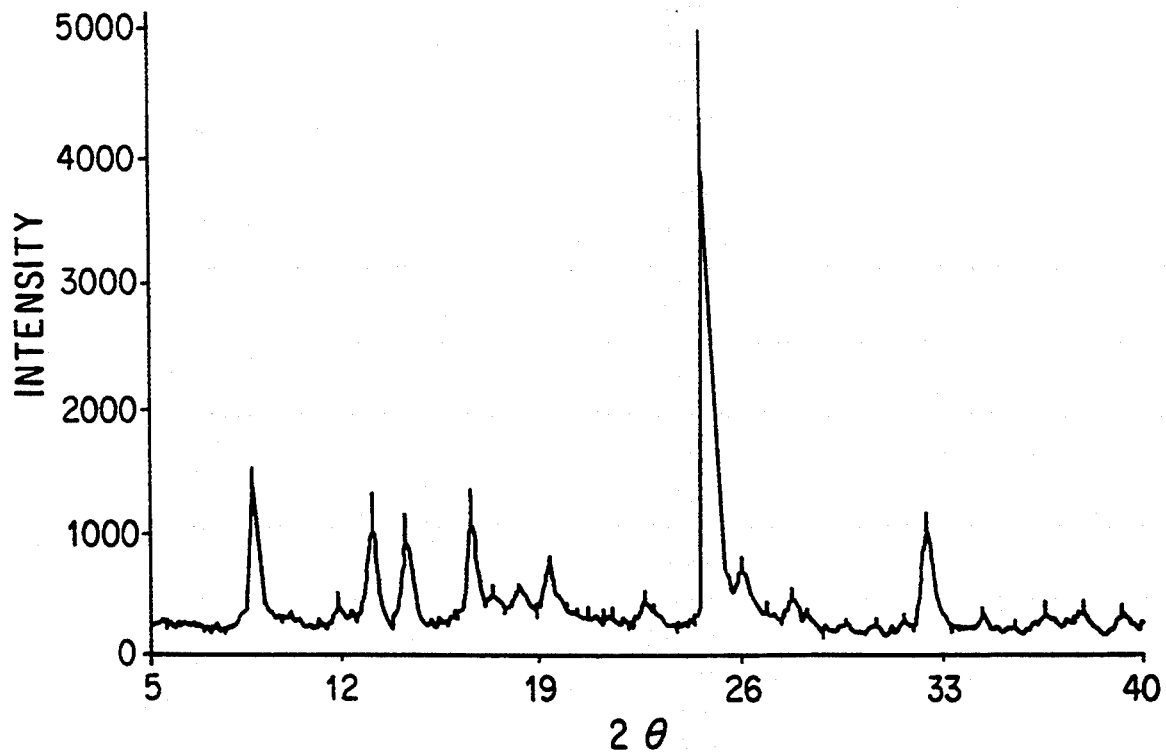
F I G. 12
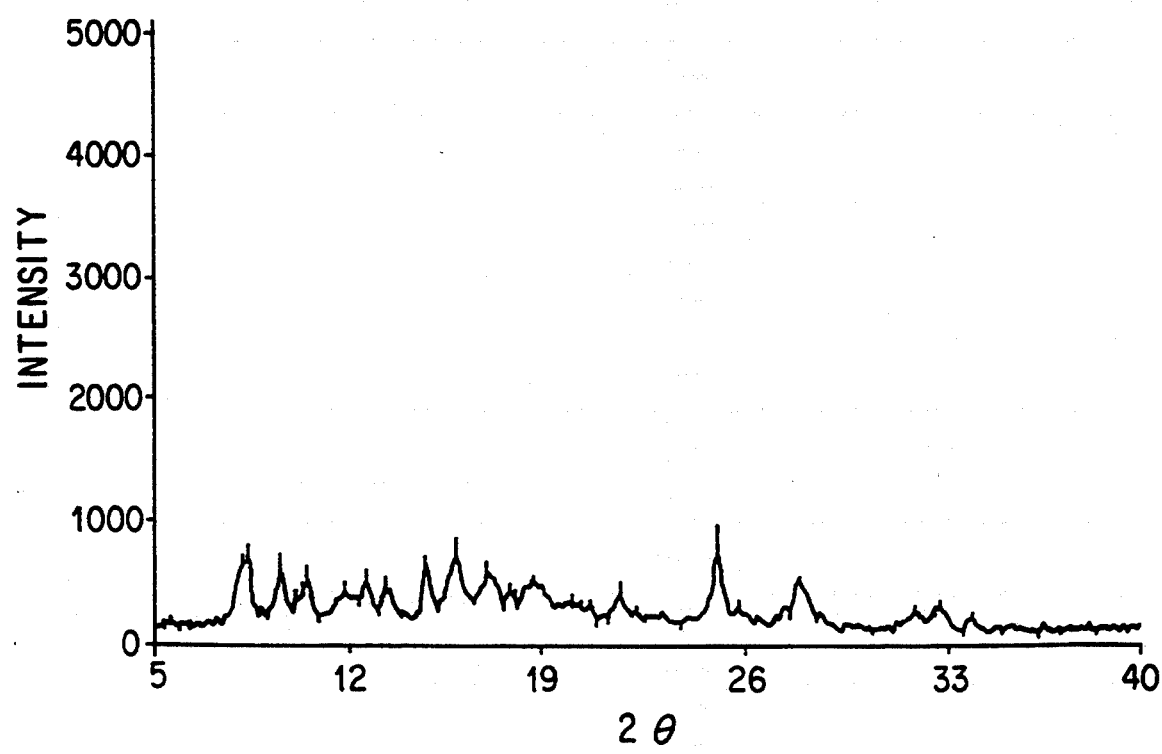
F I G. 13

DICHLOROTIN PHTHALOCYANINE CRYSTAL ELECTROPHOTOGRAPHIC PHOTORECEPTOR USING THE SAME, AND COATING COMPOSITION FOR ELECTROPHOTOGRAPHIC PHOTORECEPTOR

CROSS REFERENCE TO RELATED APPLICATION

This application is a continuation-in-part of application Ser. No. 07/948,482 filed on Sep. 22, 1992, now abandoned.

FIELD OF THE INVENTION

The present invention relates to a novel crystal of dichlorotin phthalocyanine useful as a charge generating material, a process for preparing the same, and an electrophotographic photoreceptor and a coating composition for an electrophotographic photoreceptor using the same. More particularly, it relates to an electrophotographic photoreceptor containing a specific combination of a charge generating material and a binder resin and to an electrophotographic photoreceptor coating composition containing a specific combination of a charge generating material and a dispersing solvent.

BACKGROUND OF THE INVENTION

Phthalocyanine compounds are useful as coatings, printing inks, catalysts, or electronic materials. In recent years, they have been extensively studied particularly for their use as electrophotographic photoreceptor materials, optical recording materials and photoelectric conversion materials.

In the field of electrophotographic photoreceptors, there has recently been an increasing demand to extend the photosensitive wavelength region of conventional organic photoconductive materials to a longer side of near infrared light (780 to 830 nm) which corresponds to a wavelength region of a semiconductor laser so as to make them applicable to a digital recording system, such as a laser printer. From this point of view, there have been reported photoconductive materials for semiconductor lasers, such as squarylium compounds as disclosed in JP-A-49-105536 and JP-A-58-21416, triphenylamine type tris-azo compounds as disclosed in JP-A-61-151659, and phthalocyanine compounds as disclosed in JP-A-48-34189 and JP-A-57-148745 (the term "JP-A" as used herein means an "unexamined published Japanese patent application").

In cases where an organic photoconductive material is used as a photosensitive material for semiconductor lasers, they are required to have a photosensitive wavelength region extended to a longer side and to provide a photoreceptor having satisfactory sensitivity and durability. None of the above-described conventional organic photoconductive materials sufficiently satisfies these requirements.

In order to overcome the drawbacks of the conventional organic photoconductive materials, the relationship between their crystal form and electrophotographic characteristics has been studied. In particular, many reports have hitherto been made on phthalocyanine compounds.

It is known that phthalocyanine compounds generally exhibit several different crystal forms depending on the process of production or the process of treatment and that the difference in crystal form has a great influence on their photoelectric conversion characteristics. For example, known crystal forms of copper phthalocyanine compounds include $\alpha$-, $\epsilon$-, $\pi$-, $\chi$-, $\rho$-, $\gamma$-, and $\delta$-forms as well as a stable $\beta$-form These crystal forms are known capable of interconversion by a mechanical strain, a sulfuric acid treatment, an organic solvent treatment, a heat treatment, and the like as described, e.g., in U.S. Pat. Nos. 2,770,629, 3,160,635, 3,708,292, and 3,357,989. Further, JP-A-50-38543 refers to the relationship between a crystal form of copper phthalocyanine and its electrophotographic characteristics.

JP-A-62-119547 discloses an electrophotographic photoreceptor using a dihalogenotin phthalocyanine compound as a charge generating material. JP-A-1-144057 discloses a tin phthalocyanine compound having specific peaks on its X-ray diffraction pattern and an electrophotographic photoreceptor using the same.

However, any of the known phthalocyanine compounds proposed to date is still unsatisfactory in photosensitivity and durability when used as a photosensitive material. Besides the performance problems, they need complicated manipulations for crystal transformation, or the crystal form is difficult to control.

Further, dichlorotin phthalocyanine compounds have poor dispersibility in a binder resin only to produce a dispersion having poor coating properties. As a result, photoreceptors using dichlorotin phthalocyanine compounds exhibit insufficient sensitivity characteristics and insufficient charge retention and also tend to cause image defects, such as fog and black spots, called black pepper.

Conventional tin phthalocyanine compounds have poor crystal form stability in a solvent. Therefore, when dispersed in a solvent or after being coated to form a photosensitive layer, the compound cannot maintain its crystal form for a sufficient period of time, failing to exhibit satisfactory performance properties as a charge generating material.

That is, if a dichlorotin phthalocyanine compound has too a small primary particle size, it has poor crystal stability in a solvent and is liable to be transformed to another crystal form. Conversely, if the primary particle size is too large, the resulting photoreceptor would suffer from marked reduction in sensitivity and stability. In addition, dichlorotin phthalocyanine compounds have another problem that the crystal form stability greatly depends on the kind of a dispersing solvent. The dichlorotin phthalocyanine crystal previously proposed by the present inventors cannot still get rid of the problem of poor crystal form stability in a solvent and is easily transformed to another crystal form, making it difficult to take full advantage of its electrophotographic characteristics.

SUMMARY OF THE INVENTION

An object of the present invention is to provide dichlorotin phthalocyanine having a novel crystal form which exhibits photosensitivity in the longer wavelength region and is useful as a charge generating material and to provide a process for preparing the same.

Another object of the present invention is to provide an electrophotographic photoreceptor having high photosensitivity and excellent durability and particularly a photoreceptor which has further improved sensitivity characteristics, exhibits satisfactory charge retention, and causes no substantial image defects.

A further object of the present invention is to provide a coating composition for a photosensitive layer having stably dispersed therein the above-described dichlorotin phthalocyanine crystal thereby providing an electrophotographic photoreceptor capable of maintaining the dichlorotin phthalocyanine crystal form in its photosensitive layer for a prolonged period of time.

The present inventors have sought for a charge generating material having excellent photosensitivity characteristics while paying attention to combination of such a charge generating material with a binder resin and a dispersing solvent.

As a result, the present inventors have found that a novel dichlorotin phthalocyanine crystal obtained by subjecting synthetically prepared dichlorotin phthalocyanine to a simple treatment is useful as a charge generating material and provides an electrophotographic photoreceptor exhibiting high sensitivity and durability. The present inventors also have found that an electrophotographic photoreceptor having further improved sensitivity characteristics, satisfactory charge retention, and causing no image defects can be obtained by combining the novel crystal with a specific binder resin to constitute a photosensitive layer, while retaining satisfactory dispersibility of the crystal and satisfactory coating properties of the dispersion. It has further been found that an electrophotographic photoreceptor having further improved sensitivity characteristics and stability upon repeated use can be obtained by combining the novel crystal with a particular charge transporting material. It has further been found that the novel crystal, when combined with a specific dispersing solvent, provides a coating composition having dispersed therein the crystal without changing its crystal form. In a photosensitive layer prepared from the coating composition, the crystal form of the dichlorotin phthalocyanine can be maintained for a prolonged period of time, thereby making it possible to take full advantage of the photosensitivity characteristics inherent to the novel crystal form. The present invention has been completed based on these findings.

The present invention relates to a dichlorotin phthalocyanine crystal having distinct diffraction peaks at 8.5°, 11.2°, 14.5°, and 27.2° of the Bragg angles ($2\theta \pm 0.2$) in the X-ray diffraction spectrum.

The present invention also relates to a process for producing the dichlorotin phthalocyanine crystal, which comprises mechanically grinding dichlorotin phthalocyanine together with an inorganic salt and, optionally subjecting the ground dichlorotin phthalocyanine to a solvent treatment.

The present invention further relates to an electrophotographic photoreceptor comprising a conductive substrate having thereon a photosensitive layer comprising the dichlorotin phthalocyanine crystal. In a preferred embodiment, the electrophotographic photoreceptor has a laminate structure comprising a charge generating layer and a charge transporting layer, and the charge generating layer contains the dichlorotin phthalocyanine crystal and at least one binder resin selected from the group consisting of a polyvinyl acetal resin, a vinyl chloride-vinyl acetate copolymer resin, a phenoxy resin, and a modified ether type polyester resin.

The present invention still further relates to an electrophotographic photoreceptor comprising a conductive substrate having formed thereon a photosensitive layer comprising (a) a dichlorotin phthalocyanine crystal having distinct diffraction peaks at 8.5°, 11.2°, 14.5°, and 27.2° of the Bragg angles ($2\theta \pm 0.2$) in the X-ray diffraction spectrum as a charge generating material, and (b) a benzidine compound represented by formula (I) as a charge transporting material:

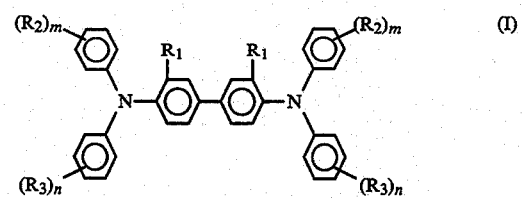

wherein $R_1$ represents a hydrogen atom, an alkyl group, an alkoxy group, or a halogen atom, two groups represented by $R_1$ may be the same or different; $R_2$ and $R_3$ represents a hydrogen atom, an alkyl group, an alkoxy group, a halogen atom, or a substituted amino group, two groups represented by $R_2$ may be the same or different, two groups represented by $R_3$ may be the same or different; and m and n, which may be the same or different, each represents an integer of from 0 to 2. In a preferred embodiment, the electrophotographic photoreceptor has a laminate structure comprising a charge generating layer and a charge transporting layer laminated on the charge generating layer, the dichlorotin phthalocyanine crystal (a) is contained in the charge generating layer, and the benzidine compound (b) represented by formula (I) is contained in the charge transporting layer.

The present invention still further relates to a coating composition for producing an electrophotographic photoreceptor, which comprises the dichlorotin phthalocyanine crystal having a primary particle diameter of from 0.03 to 0.15 μm, a binder resin, and a dispersing solvent selected from acetic esters.

BRIEF DESCRIPTION OF THE DRAWING

FIGS. 12 and 13 are X-ray diffraction patterns of the photosensitive coating compositions prepared in Comparative Examples 11 and 12, respectively.

DETAILED DESCRIPTION OF THE INVENTION

The dichlorotin phthalocyanine crystal according to the present invention has distinct diffraction peaks at 8.5°, 11.2°, 14.5°, and 27.2° of the Bragg angles ($2\theta \pm 0.2$) in the X-ray diffraction spectrum.

In the present invention, the X-ray diffraction pattern is the measurement results of intensities of the Bragg angle ($2\theta$) with respect to $CuK_\alpha$ characteristic X-ray (wavelength: 1.541 Å). The measurement conditions are as follows:

Apparatus: X-ray diffractiometer ("RAD-RC" produced by Rigaku K.K.)
Target: Cu (1.54050 Å)
Voltage: 40.0 KV
Current: 30 mA
Start angle: 5.00 deg
Stop angle: 40.00 deg
Step angle: 0.020 deg The dichlorotin phthalocyanine crystal according to the present invention can be prepared by mechanically grinding dichlorotin phthalocyanine crystals synthesized by a known process by means of, for example, a ball mill, a mortar, an attritor, a roll mill, a homomixer, a sand mill, or a kneader. Use of an inorganic salt, such as sodium chloride or salt cake, as a grinding aid is preferred since it helps transformation of the starting crystal to the desired crystal form having a regular crystal size with high efficiency. The grinding aid is used in an amount usually of from 0.5 to 20 times by weight, and preferably from 1 to 10 times by weight, the weight of the starting dichlorotin phthalocyanine crystal.

The mechanically ground dichlorotin phthalocyanine may further be subjected to a solvent treatment with an organic solvent, such as toluene, dichloromethane, tetrahydrofuran (THF), or methyl ethyl ketone (MEK). The solvent treatment yields the dichlorotin phthalocyanine crystal of the present invention in its most preferred embodiment in terms of crystallinity and regularity in size. If desired, the solvent treatment may be carried out while milling together with a grinding medium, e.g., glass beads or steel beads.

The electrophotographic photoreceptor according to the present invention in which the above-described dichlorotin phthalocyanine crystal is used as a charge generating material in the photosensitive layer thereof will be explained below.

A photosensitive layer of the photoreceptor may have a single layer structure or a so-called separate function type laminate structure composed of a charge generating layer and a charge transporting layer.

Where a photosensitive layer has a laminate structure, the charge generating layer comprises the above-mentioned dichlorotin phthalocyanine crystal and a binder resin.

Figure 1:
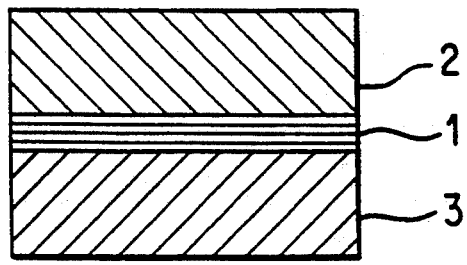
FIGS. 1 to 4 each shows a schematic cross section of the electrophotographic photoreceptor according to the present invention.
Figure 2:
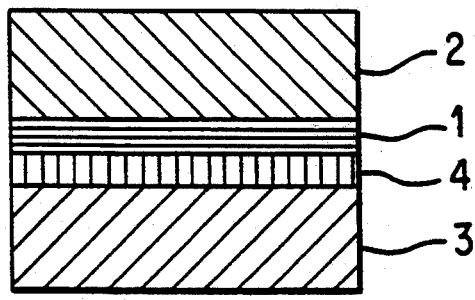
Figure 3:
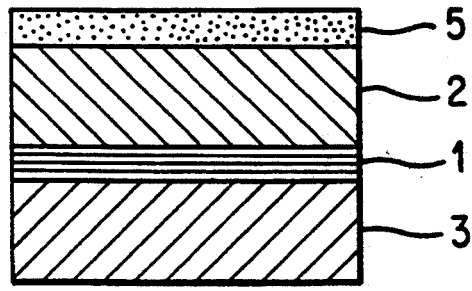
Figure 4:
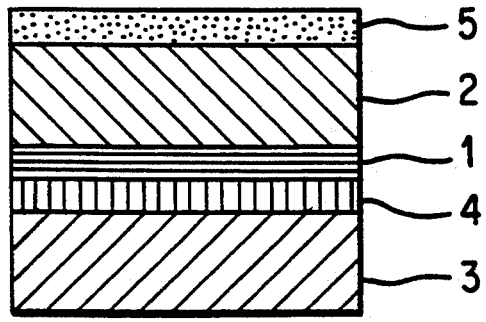

A schematic cross section of the photoreceptor according to the present invention is shown in FIGS. 1 through 4. The photoreceptor of FIG. 1 comprises conductive substrate 3 having provided thereon photosensitive layer composed of charge generating layer 1 and charge transporting layer 2 laminated on charge generating layer 1. Subbing layer 4 may be provided between charge generating layer 1 and conductive substrate 3 as shown in FIG. 2. Protective layer 5 may be provided on the surface of the photosensitive layer as shown in FIG. 3. The photoreceptor of FIG. 4 has both subbing layer 4 and protective layer 5.

The structure of the photosensitive layer will hereinafter be explained chiefly with reference to the laminate structure composed of layers 1 to 3 or 1 to 5, occasionally referring to the single layer structure.

Charge generating layer 1 is formed by coating conductive support 3 or subbing layer 4 with a coating composition prepared by dissolving a binder resin in an organic solvent and dispersing the dichlorotin phthalocyanine crystal in the solution.

Binder resins to be used can be chosen from a broad range of resins. Examples of the binder resin include insulating resins, such as polyvinyl acetal resins (including polyvinyl butyral, polyvinyl formal, and partially acetal-modified polyvinyl butyral obtained by displacing part of the butyral moiety with formal or acetoacetal), polyarylate resins (e.g., a polycondensate of bisphenol A and phthalic acid), polycarbonate resins, polyester resins, modified ether type polyester resins, phenoxy resins, polyvinyl chloride resins, polyvinylidene chloride resins, polyvinyl acetate resins, polystyrene resins, acrylic resins, methacrylic resins, polyacrylamide resins, polyamide resins, polyvinyl pyridine resins, cellulose resins, urethane resins, epoxy resins, silicone resins, polyvinyl alcohol resins, polyvinyl pyrrolidone resins, casein, vinyl chloride-vinyl acetate copolymer resins (such as a vinyl chloride-vinyl acetate copolymer, a hydroxyl-modified vinyl chloride-vinyl acetate copolymer, a carboxyl-modified vinyl chloride-vinyl acetate copolymer, and a vinyl chloride-vinyl acetate-maleic anhydride copolymer), styrene-butadiene copolymers, vinylidene chloride-acrylonitrile copolymers, styrene-alkyd resins, silicone-alkyd resins, and phenol-formaldehyde resins. Organic photoconductive polymers, such as poly-N-vinylcarbazole, polyvinyl anthracene, and polyvinylpyrene, can also be used. These specific examples are not to limit the binder resins to be used. These binder resins may be used either individually or in combination of two or more thereof.

Solvents to be used in the coating composition are preferably selected from those capable of dissolving the binder resin and incapable of dissolving a lower layer, e.g., a subbing layer, Examples of the solvents include alcohols, e.g., methanol, ethanol, n-propanol, isopropanol, n-butanol, and benzyl alcohol; ketones, e.g., acetone, methyl ethyl ketone (MEK), and cyclohexanone; amides, e.g., dimethylformamide (DMF) and dimethylacetamide; sulfoxides, e.g., dimethyl sulfoxide; cyclic or acyclic ethers, e.g., dioxane, diethyl ether, methyl cellosolve, and ethyl cellosolve; esters, e.g., methyl acetate, ethyl acetate, n-propyl acetate, isopropyl acetate, n-butyl acetate, i-butyl acetate, sec-butyl acetate, t-butyl acetate, n-amyl acetate, i-amyl acetate, methyl propionate, ethyl propionate, n-butyl propionate, and ethyl butyrate; aliphatic halogenated hydrocarbons, e.g., dichloromethane, chloroform, carbon tetrachloride, dichloroethylene, and trichloroethylene; mineral oils, e.g., ligroin; aromatic hydrocarbons, e.g., benzene, toluene, and xylene; and aromatic halogenated hydrocarbons, e.g., dichlorobenzene. These solvents may be used either individually or in combination of two or more thereof.

The weight ratio of the dichlorotin phthalocyanine crystal to the binder resin is generally from 40/1 to 1/20, and preferably from 10/1 to 1/10. If the ratio of the dichlorotin phthalocyanine crystal is too high, the coating composition may have reduced stability. If it is too low, the resulting photoreceptor may have reduced sensitivity. The coating composition preferably comprises from 1 to 5 parts by weight of the dichlorotin phthalocyanine crystal, from 1 to 5 parts by weight of a binder resin, and from 40 to 120 parts by weight of a dispersing solvent. The above compounding ratios can also be applied to a photosensitive layer having the single layer structure.

In dispersing the dichlorotin phthalocyanine crystal in a solvent containing a binder resin, conditions that induce a change of the crystal form should be avoided.

Apparatus which can be used for dispersing include a ball mill, an attritor, a sand grinder mill, a dynomill, a paint shaker, and a homomixer.

It is effective to finely disperse the crystal to a particle size of not greater than 0.5 μm, more preferably not greater than 0.2 μm, and particularly preferably from 0.03 to 0.15 μm. Too fine dichlorotin phthalocyanine particles having a primary particle diameter of less than 0.01 μm have poor crystal form stability in the solvent and are liable to transformation to another crystal form. If the dispersion contains large particles having a primary particle diameter greater than 0.5 μm, the resulting electrophotographic photoreceptor undergoes serious reduction in sensitivity and stability. Accordingly, the crystal size is preferably in the range of from 0.01 to 0.5 μm.

Coating can be carried out by any of known techniques, such as dip coating, spray coating, spinner coating, bead coating, blade coating, roller coating, and curtain coating. Drying of the coating is preferably conducted first at room temperature to once obtain a dry-to-touch state and then under heating at a temperature of from 30° to 200° C. for 5 minutes to 2 hours in still air or in an air flow.

The charge generating layer generally has a dry thickness of from about 0.015 to about 5 μm, and preferably from 0.1 to 2.0 μm.

In the present invention, it is preferable to use at least one binder resin selected from the group consisting of polyvinyl acetal resins, vinyl chloride-vinyl acetate copolymer resins, phenoxy resins, and modified ether type polyester resins, more preferably from the group consisting of polyvinyl acetal resins and vinyl chloride-vinyl acetate copolymer resins, from the standpoint of dispersibility of the dichlorotin phthalocyanine crystal, coating properties of the resulting dispersion, and performance properties of the resulting photoreceptor, such as sensitivity, charge retention, and image quality. It is preferable to use an acetic ester as a dispersing solvent because acetic ester solvents cause no change of crystal form of the dichlorotin phthalocyanine crystal not only during preparation of the dispersion but also over an extended period of time after coating the dispersion. In particular, a coating composition comprising an acetic ester as a solvent having dissolved therein at least one of the above-described specific binder resins and having dispersed therein the dichlorotin phthalocyanine crystal is the most preferred.

Charge transporting layer 2 which is laminated on charge generating layer 1 comprises a charge transporting material and an appropriate binder resin.

Any of known charge transporting materials can be utilized. Examples of the charge transporting materials, while not limiting, include oxadiazole derivatives, e.g., 2,5-bis-(p-diethylaminophenyl)-1,3,4-oxadiazole; pyrazoline derivatives, e.g., 1,3,5-triphenylpyrazoline and 1-[pyridyl-(2)]-3-(p-diethylaminostyryl)-5-(p-diethylaminophenyl)pyrazoline; aromatic tertiary monoamine compounds, e.g., triphenylamine and dibenzylaniline; aromatic tertiary diamine compounds, e.g., N,N'-diphenyl-N,N'-bis(m-tolyl)benzidine; 1,2,4-triazine derivatives, e.g., 3-(p-diethylaminophenyl)-5,6-di(p-methoxyphenyl)-1,2,4-triazine; hydrazone derivatives, e.g., 4-diethylaminobenzaldehyde-2,2-diphenylhydrazone; quinazoline derivatives, e.g., 2-phenyl-4-styrylquinazoline; benzofuran derivatives, e.g., 6-hydroxy-2,3-di(p-methoxyphenyl)benzofuran; α-stilbene derivatives, e.g., p-(2,2-diphenylvinyl)-N,N-diphenylaniline; triphenylmethane derivatives; enamine derivatives described in *Journal of Imaging Science*, Vol. 29, pp. 7–10 (1985); carbazole derivatives, e.g., carbazole, N-ethylcarbazole, poly-N-vinylcarbazole, halogenated poly-N-vinylcarbazole, polyglycidyl carbazole, and poly-γ-carbazole ethylglutamate; polycyclic aromatic compounds, e.g., anthracene, pyrene, and phenanthrene; nitrogen-containing heterocyclic compounds, e.g., indole and imidazole; polyvinyl anthracene, poly-9-vinylphenyl anthracene, polyvinyl pyrene, polyvinyl acridine, polyvinyl acenaphthylene, pyreneformaldehyde resins, and ethylcarbazole-formaldehyde resins. These charge transporting materials may be used either individually or in combination of two or more thereof. In case of using a film-forming polymeric charge transporting material, a binder resin may not be used.

In the present invention, a benzidine compound represented by formula (I) is preferably used as a charge transporting material:

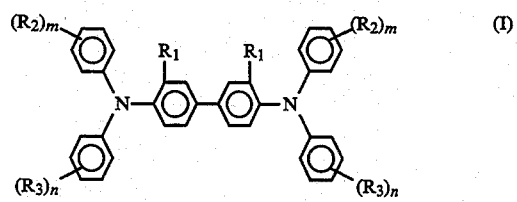

wherein $R_1$ represents a hydrogen atom, an alkyl group, an alkoxy group, or a halogen atom, two groups represented by $R_1$ may be the same or different; $R_2$ and $R_3$ represents a hydrogen atom, an alkyl group, an alkoxy group, a halogen atom, or a substituted amino group, two groups represented by $R_2$ may be the same or different, two groups represented by $R_3$ may be the same or different; and m and n, which may be the same or different each represents an integer of from 0 to 2.

Specific examples of the benzidine compound represented by formula (I) are shown in Table A below in terms of the substituents $R_1$, $R_2$ and $R_3$. The numeral before the substituent indicates the position on the aromatic ring at which the substituent is bonded.

TABLE A

| Compound No. | $R_1$ | $(R_2)_m$ | $(R_3)_n$ |
| --- | --- | --- | --- |
| 1 | CH$_3$ | H | H |
| 2 | CH$_3$ | 2-CH$_3$ | H |
| 3 | CH$_3$ | 3-CH$_3$ | H |
| 4 | CH$_3$ | 4-CH$_3$ | H |
| 5 | CH$_3$ | 4-CH$_3$ | 2-CH$_3$ |
| 6 | CH$_3$ | 4-CH$_3$ | 3-CH$_3$ |
| 7 | CH$_3$ | 4-CH$_3$ | 4-CH$_3$ |
| 8 | CH$_3$ | 3,4-CH$_3$ | H |
| 9 | CH$_3$ | 3,4-CH$_3$ | 3,4-CH$_3$ |
| 10 | CH$_3$ | 4-C$_2$H$_5$ | H |
| 11 | CH$_3$ | 4-C$_3$H$_7$ | H |
| 12 | CH$_3$ | 4-C$_4$H$_9$ | H |
| 13 | CH$_3$ | 4-C$_2$H$_5$ | 2-CH$_3$ |
| 14 | CH$_3$ | 4-C$_2$H$_5$ | 3-CH$_3$ |
| 15 | CH$_3$ | 4-C$_2$H$_5$ | 4-CH$_3$ |
| 16 | CH$_3$ | 4-C$_2$H$_5$ | 3,4-CH$_3$ |
| 17 | CH$_3$ | 4-C$_3$H$_7$ | 3-CH$_3$ |
| 18 | CH$_3$ | 4-C$_3$H$_7$ | 4-CH$_3$ |
| 19 | CH$_3$ | 4-C$_4$H$_9$ | 3-CH$_3$ |
| 20 | CH$_3$ | 4-C$_4$H$_9$ | 4-CH$_3$ |
| 21 | CH$_3$ | 4-C$_2$H$_5$ | 4-C$_2$H$_5$ |
| 22 | CH$_3$ | 4-C$_2$H$_5$ | 4-OCH$_3$ |
| 23 | CH$_3$ | 4-C$_3$H$_7$ | 4-C$_3$H$_7$ |
| 24 | CH$_3$ | 4-C$_3$H$_7$ | 4-OCH$_3$ |
| 25 | CH$_3$ | 4-C$_4$H$_9$ | 4-C$_4$H$_9$ |
| 26 | CH$_3$ | 4-C$_4$H$_9$ | 4-OCH$_3$ |

TABLE A-continued

| Compound No. | $R_1$ | $(R_2)_m$ | $(R_3)_n$ |
|---|---|---|---|
| 27 | Cl | H | H |
| 28 | Cl | 2-$CH_3$ | H |
| 29 | Cl | 3-$CH_3$ | H |
| 30 | Cl | 4-$CH_3$ | H |
| 31 | Cl | 4-$CH_3$ | 2-$CH_3$ |
| 32 | Cl | 4-$CH_3$ | 3-$CH_3$ |
| 33 | Cl | 4-$CH_3$ | 4-$CH_3$ |
| 34 | $C_2H_5$ | H | H |
| 35 | $C_2H_5$ | 2-$CH_3$ | H |
| 36 | $C_2H_5$ | 3-$CH_3$ | H |
| 37 | $C_2H_5$ | 4-$CH_3$ | H |
| 38 | $C_2H_5$ | 4-$CH_3$ | 4-$CH_3$ |
| 39 | $C_2H_5$ | 4-$C_2H_5$ | 4-$CH_3$ |
| 40 | $C_2H_5$ | 4-$C_3H_7$ | 4-$CH_3$ |
| 41 | $C_2H_5$ | 4-$C_4H_9$ | 4-$CH_3$ |
| 42 | $OCH_3$ | H | H |
| 43 | $OCH_3$ | 2-$CH_3$ | H |
| 44 | $OCH_3$ | 3-$CH_3$ | H |
| 45 | $OCH_3$ | 4-$CH_3$ | H |
| 46 | $OCH_3$ | 4-$CH_3$ | 4-$CH_3$ |
| 47 | $OCH_3$ | 4-$C_2H_5$ | 4-$CH_3$ |
| 48 | $OCH_3$ | 4-$C_3H_7$ | 4-$CH_3$ |
| 49 | $OCH_3$ | 4-$C_4H_9$ | 4-$CH_3$ |
| 50 | $CH_3$ | 2-$N(CH_3)_2$ | H |
| 51 | $CH_3$ | 3-$N(CH_3)_2$ | H |
| 52 | $CH_3$ | 4-$N(CH_3)_2$ | H |
| 53 | H | 2-$CH_3$ | H |
| 54 | H | 3-$CH_3$ | H |
| 55 | H | 4-$CH_3$ | H |
| 56 | H | 4-$CH_3$ | 4-$CH_3$ |
| 57 | H | 4-$CH_3$ | 4-$C_2H_5$ |
| 58 | H | 3-$CH_3$ | 3-$CH_3$ |

As the benzidine compound represented by formula (I), those represented by formula (II) and formula (III) are more preferred in the present invention:

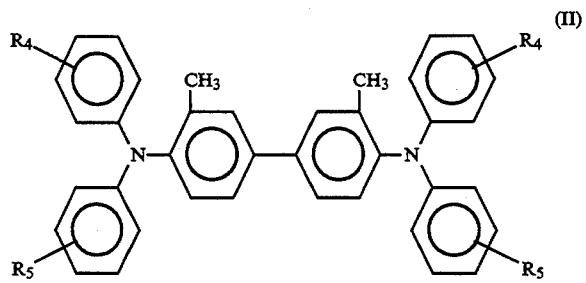

wherein $R_4$ and $R_5$, which may be the dame or different, each represents a hydrogen atom or a methyl group, two groups represented by $R_4$ may be the same or different, and two groups represented by $R_5$ may be the same or different;

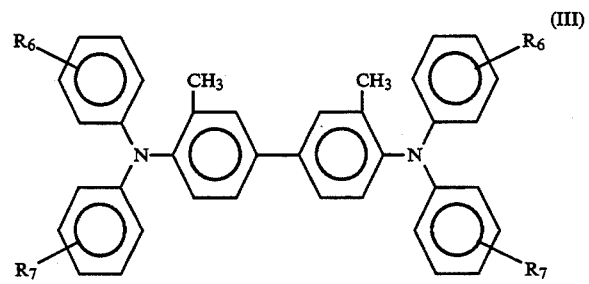

wherein one of $R_6$ and $R_7$ represents an alkyl group having 2 or more carbon atoms; the other represents a hydrogen atom, an alkyl group, an alkoxy group, or a substituted alkyl group; two groups represented by $R_6$ may be the same or different; and two groups represented by $R_7$ may be the same or different.

Binder resins which can be used in charge transporting layer 2 can be selected from those described above with reference to charge generating layer 1. Charge transporting layer 2 can be formed by coating a coating composition comprising the above-described charge transporting material, a binder resin, and an organic solvent selected from those described above for the charge generating layer. The weight ratio of the charge transporting material to the binder resin is preferably from 10/1 to 1/5.

Charge transporting layer 2 has a dry thickness generally of from about 5 to about 50 μm, and preferably of from 10 to 30 μm.

Where a photoreceptors has the single layer structure, the photosensitive layer is a photoconductive layer in which the above-described dichlorotin phthalocyanine crystal is dispersed in a binder resin together with a charge transporting material. These components may be the same as those hereinabove described. For the same reasons as described above, the binder resin is preferably selected from the group consisting of polyvinyl acetal resins, vinyl chloride-vinyl acetate copolymer resins, phenoxy resins, and modified ether type polyester resins, more preferably from the group consisting of polyvinyl acetal resins and vinyl chloride-vinyl acetate copolymer resins, and the dispersing solvent is preferably selected from acetic esters. The weight ratio of the dichlorotin phthalocyanine crystal to the charge transporting material preferably ranges from 1/10 to 10/1, and the weight ratio of the charge transporting material to the binder resin preferably ranges from about 1/20 to about 5/1.

Any conductive substrate known useful in electrophotographic photoreceptors can be used in the present invention. Examples of the substrates include metals, e.g., aluminum, nickel, chromium, and stainless steel; plastic films having thereon a thin film of aluminum, titanium, nickel, chromium, stainless steel, gold, vanadium, tin oxide, indium oxide, indium-tin oxide, etc.; and paper or plastic films having coated thereon or impregnated therein a conductivity imparting agent. While not limiting, conductive substrate 3 usually has a shape of a drum, a sheet, or a plate.

If desired, conductive substrate 3 may be subjected to various surface treatments as far as the image quality is not impaired. For example, it may be subjected to an oxidation treatment, a chemical treatment, a coloring treatment, or a non-specular finish, such as graining.

Subbing layer 4 may be provided between conductive substrate 3 and a photosensitive layer. Subbing layer 4 is effective for blocking unnecessary charges which may be introduced from conductive substrate 3 into a photosensitive layer having a laminate structure on charging of the photosensitive layer. It also serves to improve adhesion between conductive substrate 3 and the photosensitive layer. In some cases, subbing layer 4 also produces an effect of blocking light reflecting on substrate 3.

Examples of the materials for constituting subbing layer 4 include polyethylene resins, polypropylene resins, acrylic resins, methacrylic resins, polyamide resins, vinyl chloride resins, vinyl acetate resins, phenol resins, polycarbonate resins, polyurethane resins, polyimide resins, vinylidene chloride resins, polyvinyl acetal resins, vinyl chloridevinyl acetate copolymers, polyvinyl alcohol resins, polyacrylic acid resins, polyacrylamide resins, polyvinyl pyrrolidone resins, polyvinyl pyridine resins, water-soluble polyester resins, cellulose ester resins (e.g., nitrocellulose), cellulose ether resins, casein, gelatin, polyglutamic acid, starch, starch acetate, amino starch, organozirconium compounds (e.g., zirconium chelate compounds), organotitanium compounds (e.g., titanyl chelate compounds and titanium alkoxide compounds), and silane coupling agents.

Coating of subbing layer 4 can be carried out in a usual manner, for example, blade coating, spin coating, spray coating, dip coating, bead coating, roller coating, and curtain coating. Subbing layer 4 generally has a thickness of from 0.01 to 10 μm, and preferably from 0.05 to 2 μm.

Protective layer 5 may be provided on the surface of a photosensitive layer. Protective layer 5 serves to prevent chemical denaturation of charge transporting layer 2 upon charging and also to improve mechanical strength of the photosensitive layer.

Protective layer 5 comprises an appropriate binder resin having dispersed therein a conductive material. Examples of the conductive material include metallocene compounds, such as dimethylferrocene; aromatic amine compounds, such as N,N'-diphenyl-N,N'-bis(m-tolyl)benzidine; and metal oxides, such as antimony oxide, tin oxide, titanium oxide, indium oxide, and tin-antimony oxide. The binder resin to be used may be conventional ones and includes polyamide resins, polyurethane resins, polyester resins, epoxy resins, polyketone resins, polycarbonate resins, polyvinyl ketone resins, polystyrene resins, and polyacrylamide resins.

Protective layer 5 is preferably designed so as to have a volume resistivity of from $10^9$ to $10^{14}$ Ω·cm. If the volume resistivity exceeds $10^{14}$ Ω·cm, the residual potential tends to increase, causing fog. If it is lower than $10^9$ Ω·cm, the image obtained tends to suffer from blur and reduction in resolving power. In addition, protective layer 5 should be so designed not to substantially interfere with transmission of imagewise irradiated light.

Coating of protective layer 5 can be carried out in a conventional manner, for example, blade coating, spin coating, spray coating, dip coating, bead coating, roller coating, and curtain coating. Protective layer 5 generally has a thickness of from 0.5 to 20 μm, and preferably from 1 to 10 μm.

The present invention is now illustrated in greater detail with reference to Examples, but it should be understood that the present invention is not deemed to be limited thereto. All the parts and percents are by weight unless otherwise indicated.

SYNTHESIS EXAMPLE 1

To 350 ml of 1-chloronaphthalene were added 50 g of phthalonitrile and 27 g of anhydrous stannic chloride, and the mixture was allowed to react at 195° C. for 5 hours. The reaction product was collected by filtration and washed successively with 1-chloronaphthalene, acetone, methanol, and water to obtain 18.3 g (yield: 27%) of a dichlorotin phthalocyanine crystal.

Figure 5:
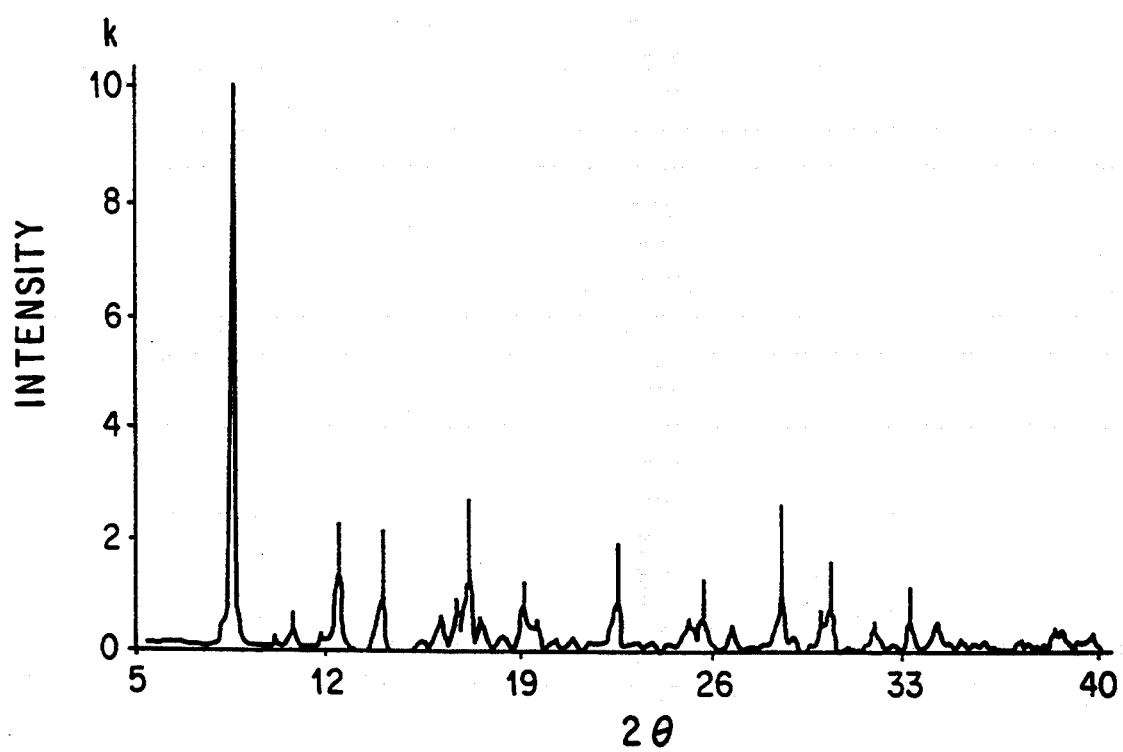
FIGS. 5 and 6 are powder X-ray diffraction patterns of the dichlorotin phthalocyanine crystals obtained in Synthesis Examples 1 and 2, respectively.

A powder X-ray diffraction pattern of the resulting dichlorotin phthalocyanine crystal is shown in FIG. 5.

SYNTHESIS EXAMPLE 2

Figure 6:
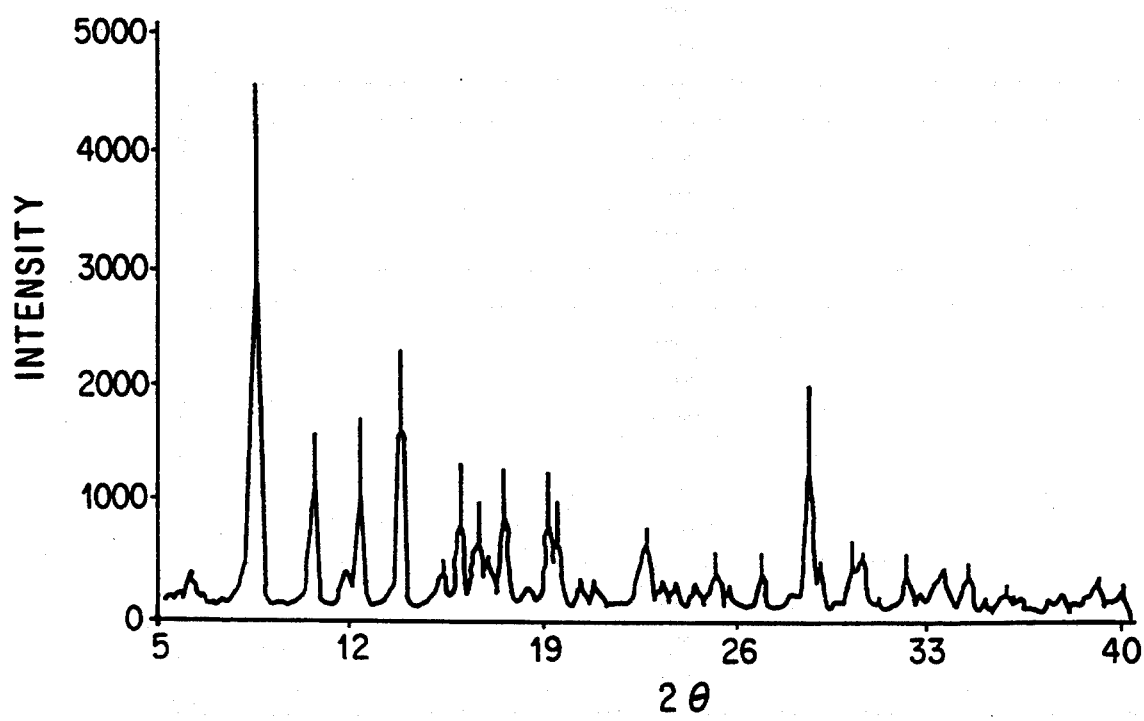

To 70 ml of 1-chloronaphthalene were added 64 g of phthalonitrile and 26 g of anhydrous stannous chloride, and the mixture was allowed to react at 200° C. for 4 hours. After cooling the reaction mixture to 100° C., 100 ml of DMF was added thereto, followed by stirring for 30 minutes. The reaction product was collected by filtration, washed successively with methanol and water, and dried under reduced pressure to obtain 79 g (yield: 90%) of a dichlorotin phthalocyanine crystal. A powder X-ray diffraction pattern of the resulting crystal is shown in FIG. 6.

EXAMPLE 1

Figure 7:
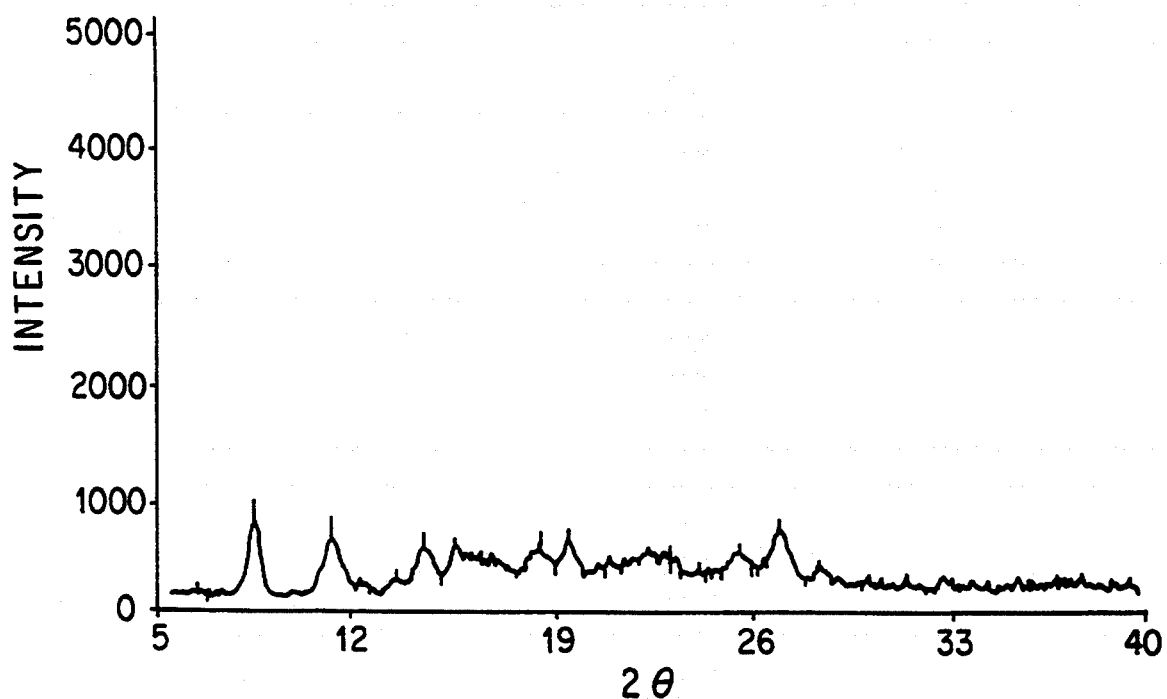
FIGS. 7 to 9 are powder X-ray diffraction patterns of the dichlorotin phthalocyanine crystals obtained in Examples 1, 3, and 7, respectively.

Five grams of the dichlorotin phthalocyanine crystal obtained in Synthesis Example 1, 10 g of sodium chloride, and 500 g of agate balls (diameter: 20 mm) were put in a 500 ml-volume pot made of agate. The contents were ground by means of a planetary ball mill "P-5" (manufactured by Fritch) at 400 rpm for 10 hours. The resulting dichlorotin phthalocyanine crystal had a uniform particle diameter ranging from 0.05 to 0.08 μm. A powder X-ray diffraction pattern of the crystal is shown in FIG. 7.

EXAMPLE 2

A dichlorotin phthalocyanine crystal was obtained in the same manner as in Example 1, except for starting with 5 g of the dichlorotin phthalocyanine obtained in Synthesis Example 2. The crystal form and particle diameter of the resulting dichlorotin phthalocyanine crystal were the same as those in Example 1.

EXAMPLE 3

Figure 8:
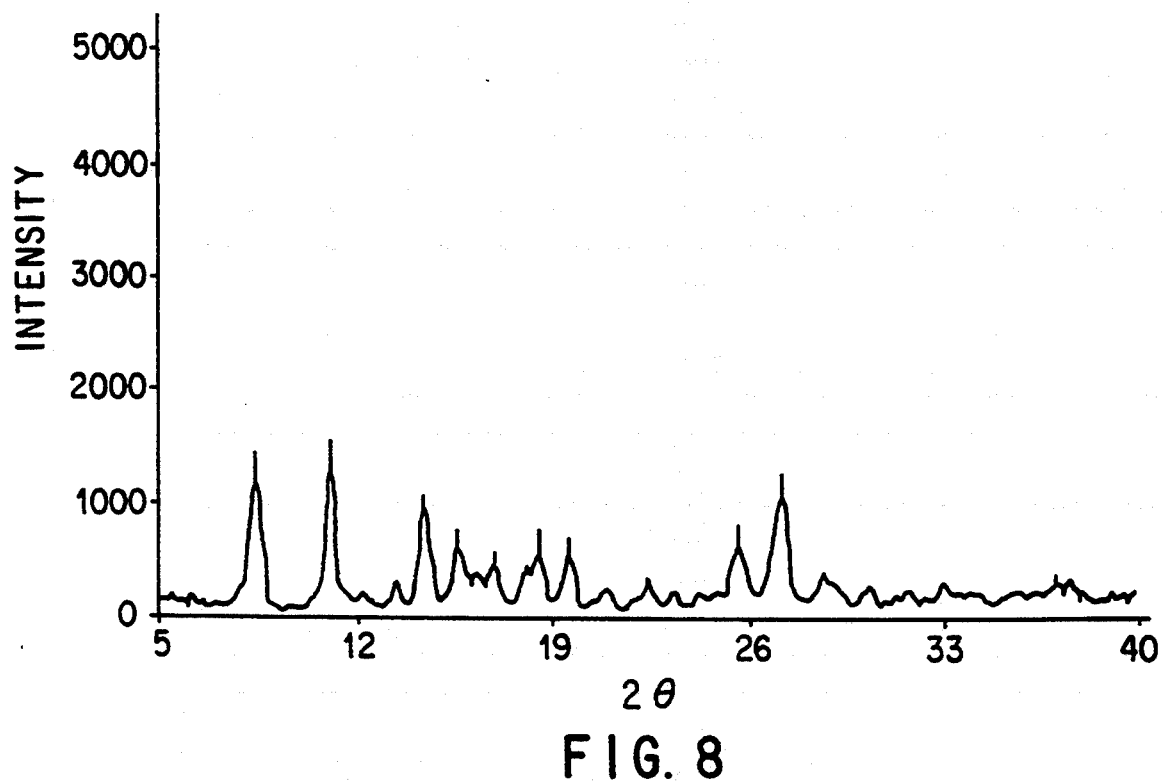

A 0.5 g portion of the dichlorotin phthalocyanine crystal obtained in Example 1 was subjected to milling together with 15 ml of THF and 30 g of glass beads (diameter: 1 mm) at room temperature for 24 hours. The glass beads were removed by filtration, and the collected product was dried to recover 0.45 g of a dichlorotin phthalocyanine crystal having a uniform particle diameter ranging from 0.05 to 0.1 μm. A powder X-ray diffraction pattern of the resulting dichlorotin phthalocyanine crystal is shown in FIG. 8.

EXAMPLE 4

The same procedure of Example 3 was repeated, except for replacing THF with n-butyl acetate. The resulting dichlorotin phthalocyanine crystal had a uniform particle diameter of from 0.05 to 0.1 μm. The powder X-ray diffraction pattern of the resulting crystal was the same as FIG. 8.

EXAMPLE 5

The same procedure of Example 1 was repeated, except for using no sodium chloride as a grinding aid. While the powder X-ray diffraction pattern of the resulting dichlorotin phthalocyanine crystal was the same as FIG. 7, the ground particles were found to be non-uniform in diameter and comprise mainly those between 0.05 μm and 0.08 μm with those around 0.5 μm.

EXAMPLE 6

The same procedure of Example 3 was repeated, except for starting with 0.5 g of the dichlorotin phthalocyanine crystal obtained in Example 5. While the powder X-ray diffraction pattern of the resulting dichlorotin phthalocyanine crystal was the same as FIG. 8, the ground particles were found to have a non-uniform diameter of from 0.05 to 0.2 μm.

EXAMPLE 7

Figure 9:
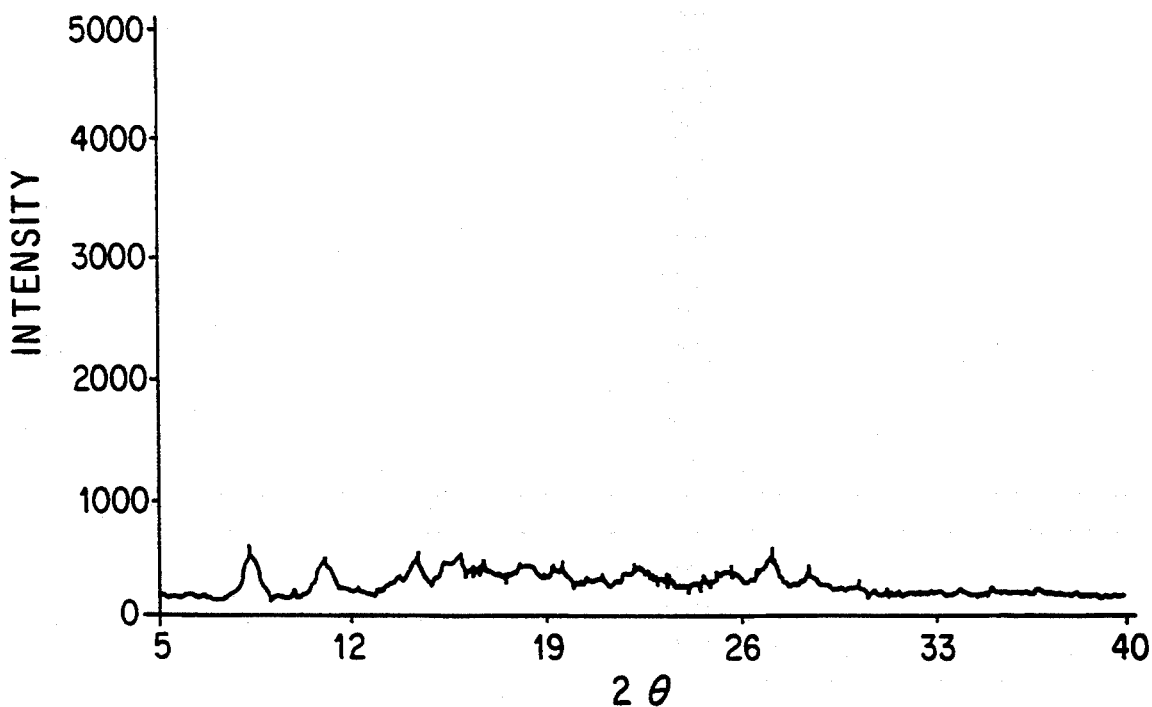

The same procedure of Example 1 was repeated, except for conducting grinding for 30 hours. The resulting dichlorotin phthalocyanine crystal had a particle diameter of from 0.01 to 0.03 μm, proving further finer than those obtained in Example 1 with a narrower size distribution. A powder X-ray diffraction pattern of the resulting crystal is shown in FIG. 9.

COMPARATIVE EXAMPLE 1

Figure 10:
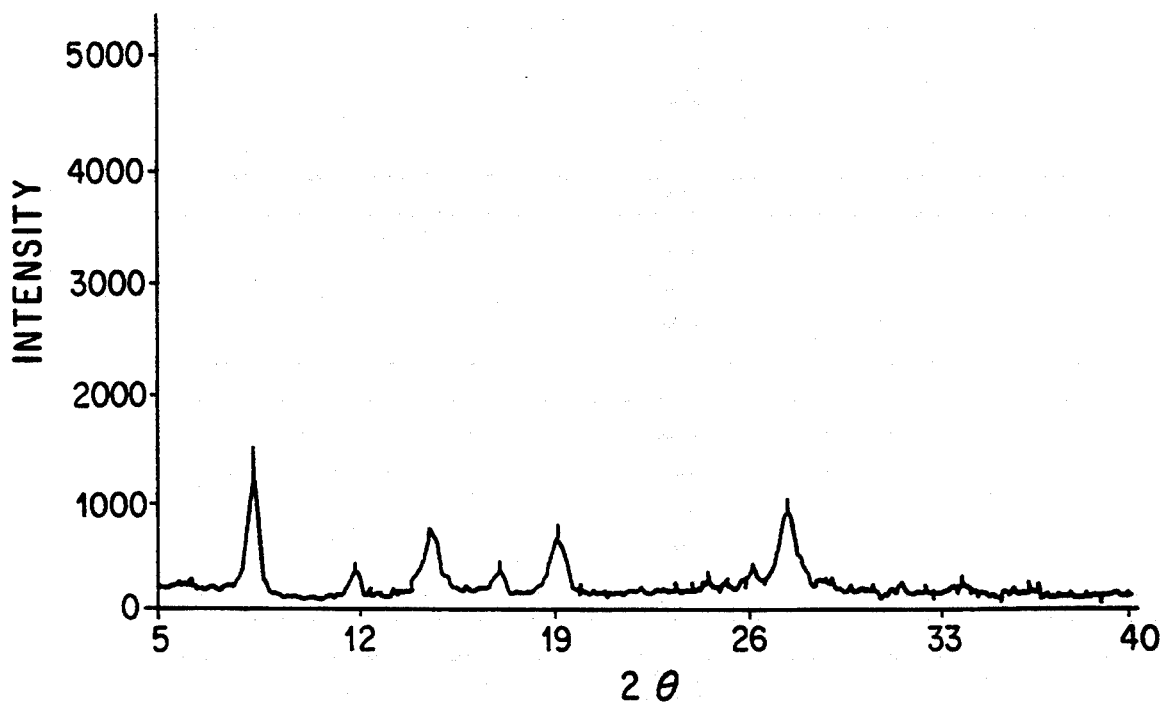
FIG. 10 is a powder X-ray diffraction pattern of the dichlorotin phthalocyanine crystal obtained in Comparative Example 1.

One gram of the dichlorotin phthalocyanine crystal obtained in Synthesis Example 1 was slowly added to 30 ml of concentrated sulfuric acid under cooling with ice at 0° to 5° C. and dissolved therein. The insoluble matter of small amount was separated by filtration, and the filtrate was added dropwise to 500 ml of ice-water while vigorously stirring. The precipitate thus formed was collected by filtration and washed with water repeatedly until the washing became neutral. The solid was dried under reduced pressure to recover 0.76 g of a dichlorotin phthalocyanine crystal. A powder X-ray diffraction pattern of the resulting crystal is shown in FIG. 10.

EXAMPLE 8

One part of the dichlorotin phthalocyanine crystal obtained in Example 1 was mixed with 1 part of polyvinyl butyral ("S-Lec BM-1", produced by Sekisui Chemical Co., Ltd.) and 100 parts of cyclohexanone, and the mixture was dispersed in a paint shaker together with glass beads for 1 hour. The resulting coating composition was coated on an aluminum substrate as a conductive substrate by dip coating and dried by heating at 100° C. for 5 minutes to form a 0.2 μm thick charge generating layer.

In 20 parts of chlorobenzene were dissolved 2 parts of N,N'-diphenyl-N,N'-bis(m-tolyl)benzidine represented by formula:

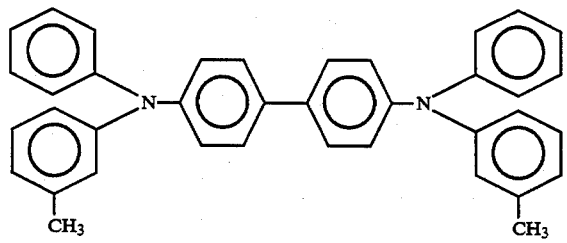

and 3 parts of poly[1,1-di(p-phenylene)cyclohexanecarbonate] of formula:

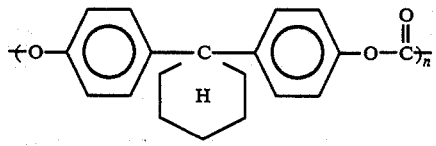

(Viscosity-average molecular weight: 39,000)

and the resulting coating composition was coated on the charge generating layer by dip coating and dried by heating at 120° C. for 1 hour to form a 20 μm thick charge transporting layer.

Electrophotographic characteristics of the resulting electrophotographic photoreceptor were evaluated as follows:

The photoreceptor was charged to −6 kV with a corona discharge in an ambient temperature and ambient humidity condition (20° C., 40% RH) by means of an electrostatic duplicating paper test device ("Electrostatic Analyzer EPA-8100" manufactured by Kawaguchi Denki Co.) and then exposed to monochromatic light (800 nm) isolated from light emitted from a tungsten lamp by a monochromator at an energy density of 1 μW/cm². The initial surface potential $V_0$ (V) of the photoreceptor and the exposure amount $E_{\frac{1}{2}}$ (erg/cm²) necessary for $V_0$ to be reduced to ½ were measured. Then, the photoreceptor was then irradiated with tungsten light of 10 lux for 1 second, and the residual potential $V_R$ (V) was measured. Further, the above-described charging and exposure were repeated 1,000 times and the same measurements of $V_0$, $E_{\frac{1}{2}}$, and $V_R$ were made. The results obtained are shown in Table 1 below.

EXAMPLES 9 AND 12

An electrophotographic photoreceptor was prepared in the same manner as in Example 8, except for using each of the dichlorotin phthalocyanine crystals obtained in Examples 3 to 6. The resulting photoreceptor was evaluated in the same manner as in Example 8, and the results obtained are shown in Table 1.

COMPARATIVE EXAMPLE 2

An electrophotographic photoreceptor was prepared in the same manner as in Example 8, except for using the dichlorotin phthalocyanine crystal obtained in Synthesis Example 1. The resulting photoreceptor was evaluated in the same manner as in Example 8, and the results obtained are shown in Table 1.

COMPARATIVE EXAMPLE 3

An electrophotographic photoreceptor was prepared in the same manner as in Example 8, except for using the dichlorotin phthalocyanine crystal obtained in Comparative Example 1. The resulting photoreceptor was evaluated in the same manner as in Example 8, and the results obtained are shown in Table 1.

TABLE 1

| Example No. | Dichlorotin Phthalocyanine Crystal Used | 1st Operation $V_0$ (V) | 1st Operation $E_{\frac{1}{2}}$ (erg/cm²) | 1st Operation $V_R$ (V) | 1,000th Operation $V_0$ (V) | 1,000th Operation $E_{\frac{1}{2}}$ (erg/cm²) | 1,000th Operation $V_R$ (V) |
|---|---|---|---|---|---|---|---|
| Example 8 | Example 1 | −840 | 3.5 | −7 | −830 | 3.7 | −9 |
| Example 9 | Example 3 | −850 | 2.8 | −4 | −845 | 2.9 | −5 |
| Example 10 | Example 4 | −840 | 2.9 | −4 | −830 | 3.1 | −8 |
| Example 11 | Example 5 | −840 | 4.5 | −10 | −820 | 4.8 | −13 |
| Example 12 | Example 6 | −850 | 3.5 | −8 | −830 | 3.9 | −13 |

TABLE 1-continued

| Example No. | Dichlorotin Phthalocyanine Crystal Used | Electrophotographic Characteristics | | | | | |
| --- | --- | --- | --- | --- | --- | --- | --- |
| | | 1st Operation | | | 1,000th Operation | | |
| | | $V_0$ (V) | $E_{\frac{1}{2}}$ (erg/cm$^2$) | $V_R$ (V) | $V_0$ (V) | $E_{\frac{1}{2}}$ (erg/cm$^2$) | $V_R$ (V) |
| Comparative Example 2 | Synthesis Example 1 | −870 | 8.5 | −11 | −840 | 8.4 | −14 |
| Comparative Example 3 | Comparative Example 1 | −690 | 6.1 | −8 | −535 | 6.9 | −15 |

EXAMPLE 13

A solution of 1 part of an alcohol-soluble nylon resin ("Lacamide L-5003" produced by Dai-Nippon Ink Co. Ltd.) in 10 parts of methanol was dip coated on an aluminum substrate and dried at 120° C. for 10 minutes to form a 0.5 μm thick subbing layer.

One part of the dichlorotin phthalocyanine crystal obtained in Example 1 was mixed with 1 part of polyvinyl butyral ("S-Lec BM-S" produced by Sekisui Chemical Co., Ltd.) and 100 parts of n-butyl acetate, and the mixture was dispersed in a paint shaker together with glass beads for 1 hour. Analysis of the resulting coating composition by X-ray diffractiometry revealed that the dichlorotin phthalocyanine crystal therein has the same crystal form as that before dispersing. The coating composition was dip coated on the subbing layer and dried by heating at 100° C. for 10 minutes to form a 0.15 μm thick charge generating layer.

A charge transporting layer was then formed thereon in the same manner as in Example 8, and the resulting photoreceptor was evaluated in the same manner as in Example 8. The results obtained are shown in Table 2 below.

EXAMPLE 14

An electrophotographic photoreceptor was prepared in the same manner as in Example 13, except for replacing the polyvinyl butyral resin with 1 part of a polyester resin ("Vylon 200" produced by Toyobo Co., Ltd.). The resulting photoreceptor was evaluated in the same manner as in Example 13, and the results obtained are shown in Table 2.

COMPARATIVE EXAMPLE 4

An electrophotographic photoreceptor was prepared in the same manner as in Example 13, except for using the dichlorotin phthalocyanine crystal obtained in Synthesis Example 1. The resulting photoreceptor was evaluated in the same manner as in Example 13, and the results obtained are shown in Table 2.

COMPARATIVE EXAMPLE 5

An electrophotographic photoreceptor was prepared in the same manner as in Example 13, except for using the dichlorotin phthalocyanine crystal obtained in Comparative Example 1. The resulting photoreceptor was evaluated in the same manner as in Example 13, and the results obtained are shown in Table 2.

EXAMPLE 15

A solution of 1 part of an alcohol-soluble nylon resin ("CM-8000" produced by Toray Industries, Inc.) in 10 parts of methanol was dip coated on an aluminum substrate and dried at 110° C. for 10 minutes to form a 0.1 μm thick subbing layer.

One part of the dichlorotin phthalocyanine crystal obtained in Example 3 was mixed with 1 part of a partially formal-modified polyvinyl butyral resin ("S-Lec BX-2" produced by Sekisui Chemical Co., Ltd.) and 100 parts of cyclohexanone, and the mixture was dispersed in a paint shaker together with glass beads for 1 hour. Analysis of the resulting coating composition by X-ray diffractiometry revealed that the dichlorotin phthalocyanine crystal therein has the same crystal form as that before dispersing. The coating composition was dip coated on the subbing layer and dried by heating at 120° C. for 10 minutes to form a 0.2 μm thick charge generating layer.

A charge transporting layer was then formed thereon in the same manner as in Example 13, except for replacing the N,N'-diphenyl-N,N'-bis(m-tolyl)benzidine with 2 parts of N,N'-bis(p-tolyl)-N,N'-bis(p-ethylphenyl)-3,3'-dimethylbenzidine represented by formula:

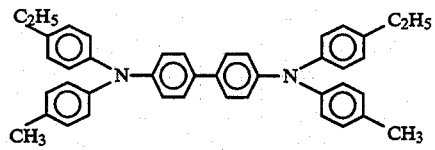

The resulting photoreceptor was evaluated in the same manner as in Example 13. The results obtained are shown in Table 2 below.

EXAMPLE 16

An electrophotographic photoreceptor was prepared in the same manner as in Example 15, except for replacing the modified polyvinyl butyral resin with 1 part of a polymethyl methacrylate resin ("Elvacite 2021" produced by E. I. du Pont). The resulting photoreceptor was evaluated in the same manner as in Example 13. The results obtained are shown in Table 2.

COMPARATIVE EXAMPLE 6

An electrophotographic photoreceptor was prepared in the same manner as in Example 15, except for using the dichlorotin phthalocyanine crystal obtained in Comparative Example 1. The resulting photoreceptor was evaluated in the same manner as in Example 13. The results obtained are shown in Table 2.

EXAMPLE 17

A solution consisting of 10 parts of a zirconium compound ("Orgatics ZC 540" produced by Matsumoto Seiyaku Co., Ltd.), 1 part of a silane compound ("A 1110" produced by Nippon Unicar Co., Ltd.), 40 parts of isopropanol, and 20 parts of butanol was dip coated on an aluminum substrate and dried at 160° C. for 10 minutes to form a 0.1 μm thick subbing layer.

One part of the dichlorotin phthalocyanine crystal obtained in Example 4 was mixed with 1 part of a vinyl chloride-vinyl acetate copolymer ("VMCH" produced by Union Carbide), and 100 parts of n-butyl acetate, and the mixture was dispersed in a paint shaker together with glass beads for 1 hour. Analysis of the resulting coating composition by X-ray diffractiometry revealed that the dichlorotin phthalocyanine crystal therein has the same crystal form as that before dispersing. The coating composition was dip coated on the subbing layer and dried by heating at 100° C. for 10 minutes to form a 0.2 μm thick charge generating layer.

A charge transporting layer was then formed thereon in the same manner as in Example 15, and the resulting photoreceptor was evaluated in the same manner as in Example 13. The results obtained are shown in Table 2 below.

TABLE 2

| Example No. | Charge Generating Layer | | Electrophotographic Characteristics | | | | | |
| | | | 1st Operation | | | 1,000th Operation | | |
| | Crystal used | Binder Resin | $V_0$ (V) | $E_{\frac{1}{2}}$ (erg/cm$^2$) | $V_R$ (V) | $V_0$ (V) | $E_{\frac{1}{2}}$ (erg/cm$^2$) | $V_R$ (V) |
| --- | --- | --- | --- | --- | --- | --- | --- | --- |
| Example 13 | Example 1 | polyvinyl butyral | −831 | 3.5 | −17 | −822 | 3.7 | −19 |
| Example 14 | Example 1 | polyester | −720 | 4.5 | −42 | −677 | 5.0 | −25 |
| Example 15 | Example 3 | partially formal-modified polyvinyl butyral | −828 | 3.4 | −14 | −816 | 3.7 | −19 |
| Example 16 | Example 3 | polymethyl methacrylate | −730 | 4.2 | −50 | −680 | 5.0 | −30 |
| Example 17 | Example 4 | vinyl chloride-vinyl acetate copolymer | −822 | 2.7 | −11 | −813 | 2.8 | −13 |
| Example 18 | Example 4 | phenoxy resin | −819 | 2.9 | −18 | −810 | 3.1 | −26 |
| Example 19 | Example 4 | modified ether type polyester resin | −823 | 2.7 | −22 | −811 | 2.8 | −34 |
| Comparative Example 4 | Synthesis Example 1 | polyvinyl butyral | −872 | 8.7 | −24 | −839 | 8.9 | −36 |
| Comparative Example 5 | Comparative Example 1 | polyvinyl butyral | −721 | 6.7 | −17 | −557 | 7.5 | −8 |
| Comparative Example 6 | Comparative Example 1 | partially formal-modified polyvinyl butyral | −672 | 7.2 | −16 | −537 | 8.3 | −28 |
| Comparative Example 7 | Comparative Example 1 | vinyl chloride-vinyl acetate copolymer | −734 | 6.4 | −27 | −643 | 7.1 | −18 |

EXAMPLE 18

An electrophotographic photoreceptor was prepared in the same manner as in Example 17, except for replacing the vinyl chloride-vinyl acetate copolymer with 1 part of a phenoxy resin ("PKHH" produced by Union Carbide) and replacing n-butyl acetate with 100 parts of cyclohexanone. The resulting photoreceptor was evaluated in the same manner as in Example 13. The results obtained are shown in Table 2 below.

EXAMPLE 19

An electrophotographic photoreceptor was prepared in the same manner as in Example 17, except for replacing the vinyl chloride-vinyl acetate copolymer with a modified ether type polyester resin ("STAFIX NLC-2" produced by Fuji Photo Film Co., Ltd.) and replacing n-butyl acetate with 100 parts of cyclohexanone. The resulting photoreceptor was evaluated in the same manner as in Example 13. The results obtained are shown in Table 2 below.

COMPARATIVE EXAMPLE 7

An electrophotographic photoreceptor was prepared in the same manner as in Example 17, except for using the dichlorotin phthalocyanine crystal obtained in Comparative Example 1. The resulting photoreceptor was evaluated in the same manner as in Example 13. The results obtained are shown in Table 2 below.

EXAMPLES 20 TO 24

Drum photoreceptors were produced under the same conditions as in Examples 13, 15, 17 to 19, respectively, and were each loaded into a semiconductor laser printer ("FX XP-15" manufactured by Fuji Xerox Co., Ltd.). Copying test was carried on 10,000 times, and the results are shown in Table 3 below.

COMPARATIVE EXAMPLES 8 TO 10

Drum photoreceptors were produced under the same conditions as in Comparative Examples 5 to 7, respectively, and evaluated in the same manner as in Example 20. The results of copying test are shown in Table 3.

TABLE 3

| Example No. | Film Properties of Charge Generating Layer | Image Defects Observed | |
| | | 1st Copy | 10,000th Copy |
| --- | --- | --- | --- |
| Example 20 | satisfactory | none | none |
| Example 21 | satisfactory | none | none |
| Example 22 | satisfactory | none | none |
| Example 23 | satisfactory | none | none |
| Example 24 | satisfactory | none | none |
| Comparative Example 8 | agglomeration in parts | some black spots | black spots and considerable fog |
| Comparative Example 9 | agglomeration in parts | some black spots | many black spots |
| Comparative Example 10 | agglomeration and streaks | many black spots | black spots and considerable fog |

COMPARATIVE EXAMPLE 11

A coating composition for a charge generating layer was prepared in the same manner as in Example 13, except for replacing n-butyl acetate with THF. Analysis of the resulting coating composition by X-ray diffractiometry revealed that the crystal form of the dichlorotin phthalocyanine was different from that before dispersing. The powder X-ray diffraction pattern of the composition is shown in FIG. 12.

Figure 11:
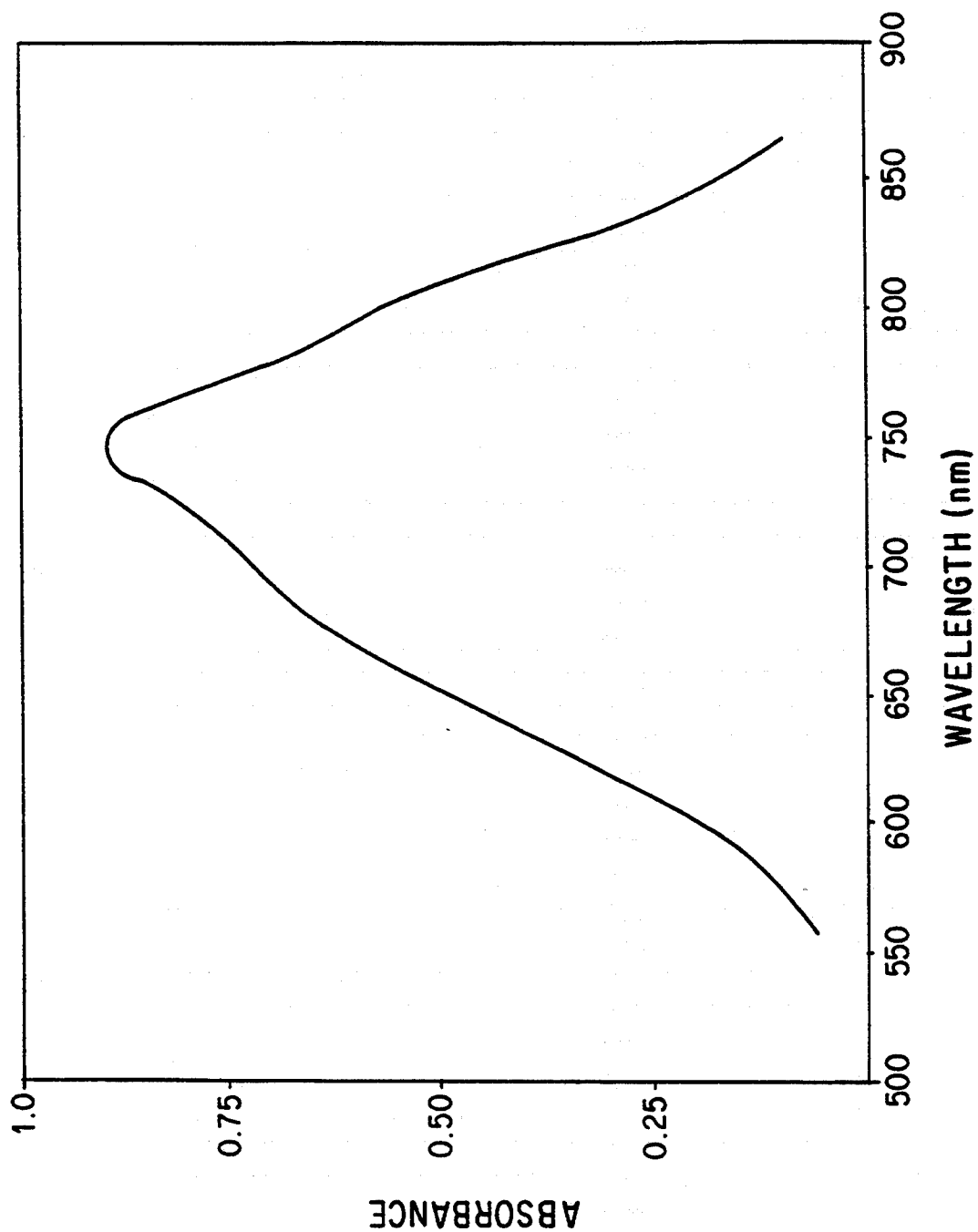
FIG. 11 is an absorption spectrum of the electrophotographic photoreceptor prepared in Comparative Example 11.

An electrophotographic photoreceptor was prepared by using the above coating composition in the same manner as in Example 13 and evaluated in the same manner as in Example 13. The results obtained are shown in Table 4 below. Further, an absorption spectrum of the photoreceptor is shown in FIG. 11.

COMPARATIVE EXAMPLE 12

A coating composition for a charge generating layer was prepared in the same manner as in Example 13, except for replacing n-butyl acetate with chlorobenzene. Analysis of the resulting coating composition by X-ray diffractiometry revealed that the crystal form of the dichlorotin phthalocyanine was different from that before dispersing. The powder X-ray diffraction pattern of the composition is shown in FIG. 13.

An electrophotographic photoreceptor was prepared by using the above coating composition in the same manner as in Example 13 and evaluated in the same manner as in Example 13. The results obtained are shown in Table 4.

TABLE 4

| Example No. | Electrophotographic Characteristics ||||||
|---|---|---|---|---|---|---|
| | 1st Operation ||| 1000th Operation |||
| | $V_0$ (V) | $E_{\frac{1}{2}}$ (erg/cm$^2$) | $V_R$ (V) | $V_0$ (V) | $E_{\frac{1}{2}}$ (erg/cm$^2$) | $V_R$ (V) |
| Comparative Example 11 | −795 | 6.2 | −35 | −624 | 6.4 | −46 |
| Comparative Example 12 | −802 | 6.1 | −82 | −711 | 6.5 | −23 |

EXAMPLE 25

A solution containing 10 parts of zirconium compound ("Orgatics ZC540", produced by Matsumoto Pharmaceutical Co., Ltd.), 1 part of silane compound ("A1110", produced by Nippon Unicar Co., Ltd.), and 40 parts of isopropanol was coated on an aluminum substrate as a conductive substrate by dip coating and dried by heating at 150° C. for 10 minutes to form a subbing layer having a thickness of 0.5 μm.

One part of the dichlorotin phthalocyanine crystal obtained in Example 3 was mixed with 1 part of polyvinyl butyral ("S-Lec BM-S", produced by Sekisui Chemical Co., Ltd.) and 100 parts of n-butyl acetate and the mixture was dispersed in a paint shaker together with glass beads for 1 hour. The resulting coating composition was coated on the subbing layer by dip coating and dried by heating at 100° C. for 10 minutes to form a charge generating layer having a thickness of 0.15 μm.

In 20 parts of chlorobenzene were dissolved 2 parts of Compound No. 3 in Table A above and 3 parts of poly[1,1-di(p-phenylene)cyclohexanecarbonate] (viscosity-average molecular weight: 39,000) used in Example 8, and the resulting coating composition was coated on the charge generating layer by dip coating and dried by heating at 120° C. for 1 hour to form a charge transporting layer having a thickness of 20 μm.

Electrophotographic characteristics, i.e., the initial surface potential ($V_0$), the exposure amount necessary for $V_0$ ($E_{\frac{1}{2}}$), and the residual potential ($V_R$), of the resulting electrophotographic photoreceptor were evaluated in the same manner as in Example 8. Further, after the charging-exposure cycle was repeated 1,000 times, $V_0$, $E_{\frac{1}{2}}$ and $V_R$ were measured, and the change from the initial values $\Delta V_0$, $\Delta E_{\frac{1}{2}}$ and $\Delta V_R$ were evaluated. The results obtained are shown in Table 5 below.

EXAMPLES 26 TO 34

Electrophotographic photoreceptors were prepared in the same manner as in Example 25, except for using charge transporting materials shown in Table 5. The resulting photoreceptors were evaluated in the same manner as in Example 25. The results obtained are shown in Table 5.

TABLE 5

| Example No. | Charge transporting material* | 1st operation ||| 1000th operation ||| Stability |||
|---|---|---|---|---|---|---|---|---|---|---|
| | | $V_0$ (V) | $E_{\frac{1}{2}}$ (erg/cm$^2$) | $V_R$ (V) | $V_0$ (V) | $E_{\frac{1}{2}}$ (erg/cm$^2$) | $V_R$ (V) | $\Delta V_0$ (V) | $\Delta E_{\frac{1}{2}}$ (erg/cm$^2$) | $\Delta V_R$ (V) |
| 25 | 3 | −860 | 2.7 | −3 | −855 | 2.7 | −4 | 5 | 0 | 1 |
| 26 | 7 | −840 | 2.8 | −4 | −830 | 3.0 | −6 | 10 | 0.2 | 2 |
| 27 | 9 | −825 | 2.7 | −5 | −820 | 2.9 | −7 | 5 | 0.2 | 2 |
| 28 | 15 | −855 | 2.5 | −2 | −850 | 2.6 | −3 | 5 | 0.1 | 1 |
| 29 | 20 | −850 | 2.6 | −3 | −845 | 2.7 | −5 | 5 | 0.1 | 2 |
| 30 | 22 | −820 | 2.5 | −3 | −810 | 2.7 | −5 | 10 | 0.2 | 2 |
| 31 | 29 | −870 | 2.9 | −10 | −860 | 3.1 | −13 | 10 | 0.2 | 3 |
| 32 | 41 | −860 | 2.7 | −4 | −850 | 2.8 | −6 | 10 | 0.1 | 2 |
| 33 | 46 | −820 | 2.6 | −3 | −805 | 2.9 | −7 | 15 | 0.3 | 4 |
| 34 | 50 | −800 | 2.6 | −3 | −780 | 2.8 | −7 | 20 | 0.2 | 4 |

Note:
*Compound number in Table A above

As described above, a novel dichlorotin phthalocyanine crystal having distinct diffraction peaks at specific Bragg angles can be obtained by subjecting dichlorotin phthalocyanine synthesized by a known process to a simple treatment of mechanically grinding together with an inorganic salt, followed by, if desired, a solvent treatment.

The novel crystal of the present invention exhibits photosensitivity in a wavelength region extending to the longer side and is therefore very useful as a charge generating material of electrophotographic photoreceptors used in, for example, a semi-conductor laser printer.

The electrophotographic photoreceptor containing the novel dichlorotin phthalocyanine crystal exhibits high sensitivity, low residual potential, and high chargeability, and is less liable to variation of these electrophotographic characteristics on repeated use, that is, highly durable. In particular, an electrophotographic photoreceptor using the dichlorotin phthalocyanine crystal in combination with a polyvinyl acetal resin or a vinyl chloride-vinyl acetate copolymer resin as a binder resin shows further improved sensitivity, satisfactory charge retention, and hardly causes image defects.

The coating composition according to the present invention contains the dichlorotin phthalocyanine crystal as a charge generating material and, as a dispersing solvent, an acetic ester in which the crystal form of dichlorotin phthalocyanine can be maintained stably. Since the dichlorotin phthalocyanine crystal undergoes no change of crystal form either when dispersed or after being coated, the excellent photosensitivity characteristics possessed by the novel crystal of dichlorotin phthalocyanine can be made full use of.

While the invention has been described in detail and with reference to specific examples thereof, it will be apparent to one skilled in the art that various changes and modifications can be made therein without departing from the spirit and scope thereof.

What is claimed is:

1. A dichlorotin phthalocyanine crystal having distinct diffraction peaks at 8.5°, 11.2°, 14.5°, and 27.2° of the Bragg angles ($2\theta \pm 0.2$) in the X-ray diffraction spectrum.

2. An electrophotographic photoreceptor comprising a conductive substrate having formed thereon a photosensitive layer comprising a dichlorotin phthalocyanine crystal having distinct diffraction peaks at 8.5°, 11.2°, 14.5°, and 27.2° of the Bragg angles ($2\theta \pm 0.2$) in the X-ray diffraction spectrum.

3. An electrophotographic photoreceptor as claimed in claim 2, wherein said photosensitive layer further comprises at least one binder resin selected from the group consisting of a polyvinyl acetal resin, a vinyl chloride-vinyl acetate copolymer resin, a phenoxy resin, and a modified ether polyester resin.

4. An electrophotographic photoreceptor as claimed in claim 3, wherein said polyvinyl acetal resin is at least one resin selected from polyvinyl butyral, polyvinyl formal, and partially acetal-modified polyvinyl butyral.

5. An electrophotographic photoreceptor as claimed in claim 3, wherein said vinyl chloride-vinyl acetate copolymer resin is at least one resin selected from a vinyl chloride-vinyl acetate copolymer, a hydroxyl-modified vinyl chloride-vinyl acetate copolymer, and a carboxyl-modified vinyl chloride-vinyl acetate copolymer.

6. An electrophotographic photoreceptor as claimed in claim 3, wherein said photosensitive layer comprises a charge generating layer and a charge transporting layer laminated on said charge generating layer, and said dichlorotin phthalocyanine crystal and said binder resin are contained in said charge generating layer.

7. An electrophotographic photoreceptor comprising a conductive substrate having formed thereon a photosensitive layer comprising (a) a dichlorotin phthalocyanine crystal having distinct diffraction peaks at 8.5°, 11.2°, 14.5°, and 27.2° of the Bragg angles ($2\theta \pm 0.2$) in the X-ray diffraction spectrum as a charge generating material, and (b) a benzidine compound represented by formula (I) as a charge transporting material:

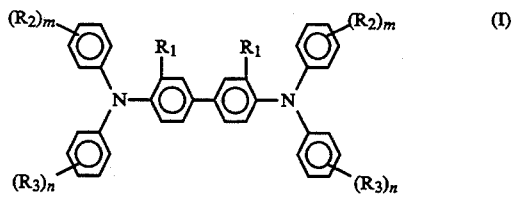

wherein $R_1$ represents a hydrogen atom, an alkyl group, an alkoxy group, or a halogen atom, two groups represented by $R_1$ may be the same or different; $R_2$ and $R_3$ represents a hydrogen atom, an alkyl group, an alkoxy group, a halogen atom, or a substituted amino group, $R_2$ may be the same or different, $R_3$ may be the same or different; and m and n, which may be the same or different, each represents an integer of from 0 to 2.

8. An electrophotographic photoreceptor as claimed in claim 7, wherein said benzidine compound represented by formula (I) is a compound represented by formula (II):

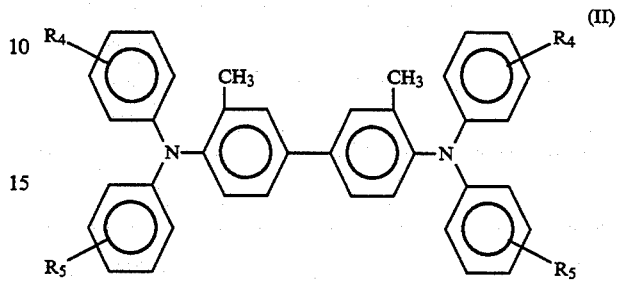

wherein $R_4$ and $R_5$, which may be the same or different each represents a hydrogen atom or a methyl group, $R_4$ may be the same or different, and $R_5$ may be the same or different.

9. An electrophotographic photoreceptor as claimed in claim 7, wherein said benzidine compound represented by formula (I) is a compound represented by formula (III):

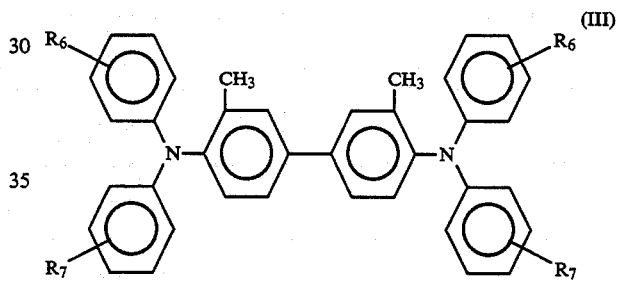

wherein one of $R_6$ and $R_7$ represents an alkyl group having 2 or more carbon atoms; the other represents a hydrogen atom, an alkyl group, an alkoxy group, or a substituted alkyl group; $R_6$ may be the same or different; and $R_7$ may be the same or different.

10. An electrophotographic photoreceptor as claimed in claim 7, wherein said photosensitive layer comprises a charge generating layer and a charge transporting layer laminated on said charge generating layer, said dichlorotin phthalocyanine crystal (a) is contained in said charge generating layer, and said benzidine compound represented by formula (I) is contained in said charge transporting layer.

11. A coating composition for producing an electrophotographic photoreceptor, which comprises a dichlorotin phthalocyanine crystal having a primary particle diameter of from 0.03 to 0.15 μm and having distinct diffraction peaks at 8.5°, 11.2°, 14.5°, and 27.2° of the Bragg angles ($2\theta \pm 0.2$) in the X-ray diffraction spectrum, a binder resin, and an acetic ester solvent.

12. A coating composition as claimed in claim 11, wherein said binder resin is a polyvinyl acetal resin.

13. A coating composition as claimed in claim 12, wherein said polyvinyl acetal resin is at least one resin selected from polyvinyl butyral, polyvinyl formal, and partially acetal-modified polyvinyl butyral.

14. A coating composition as claimed in claim 11, wherein said binder resin is a vinyl chloride-vinyl acetate copolymer resin.

* * * * *